July 10, 1951 — R. R. AMESBURY — 2,560,518
FRICTION NUT
Filed March 5, 1947
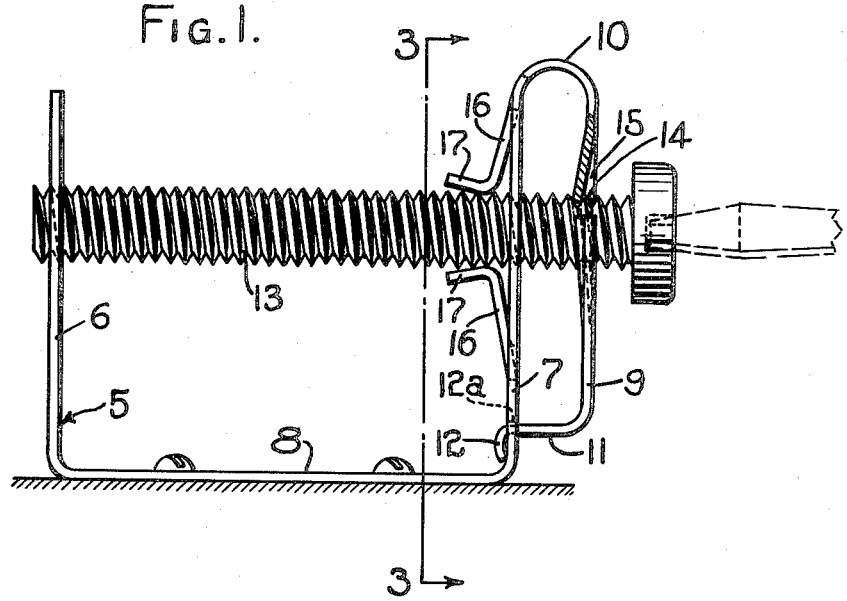
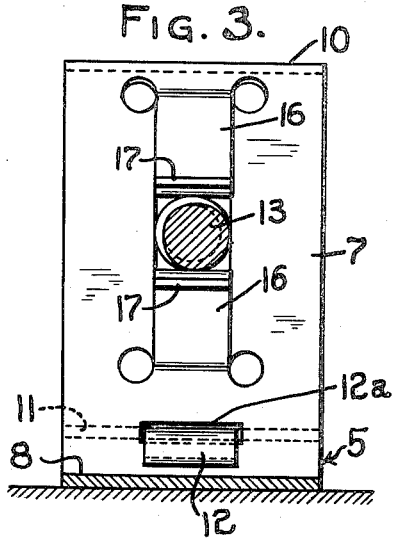
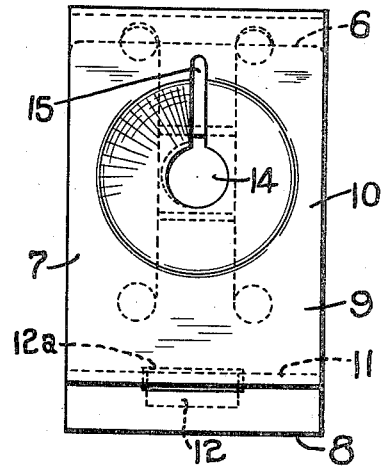
Inventor
ROBERT R. AMESBURY,
By Walter J. Jones
Attorney Patented July 10, 1951

2,560,518

UNITED STATES PATENT OFFICE 2,560,518

FRICTION NUT

Robert R. Amesbury, Wellesley, Mass., assignor to United-Carr Fastener Corporation, Cambridge, Mass., a corporation of Massachusetts Application March 5, 1947, Serial No. 732,547

3 Claims. (Cl. 85—36)

The present invention relates to friction nuts or clamps for threaded screws and the like and aims generally to improve existing devices of that type.

The invention has for one of its principal objects the provision for a simple and inexpensive sheet metal nut having a plurality of substantially aligned thread-engaging means, one of which is formed with a slot, the walls of which receive the screw threads and the other of which is formed with lips which resiliently press against the threads at a distance from such slotted means to exert constant frictional tension upon the bolt shank to retain it in its adjusted position.

Another object of this invention is to provide a fastener for an adjustable bolt or screw comprising a dual armed friction nut device designed both to receive the threaded portion of the bolt and to exert constant spring tension upon the shank of the bolt at a distance from the thread-receiving portion to lock the bolt in its adjusted position but permitting it to be turned when sufficient force is applied thereto by a suitable tool.

A further object of this invention is the construction of an improved dual armed friction nut integrally with a sheet metal angle arm or bracket, the nut portion comprising a substantially U-shaped member provided with a locking tab at the open end bent from one leg of the U and passing through a slot in the other leg to maintain desired spacing between the legs of the U-shaped member.

The above and other aims and objects will be apparent from a consideration of the accompanying drawings and annexed specification illustrating and describing a preferred embodiment of the invention.

In the drawings:

Fig. 1 is an enlarged side elevation of my improved friction nut integrally formed with a bracket support.

Fig. 2 is a bottom plan view thereof, the screw being omitted, and

Fig. 3 is a cross-section taken substantially on the line 3—3 of Fig. 1.

Referring now to the illustrated embodiment, reference number 5 designates a bracket or like support adapted to be suitably secured at a desired location, as for example, for use in a radio receiving set. The bracket 5 is formed from a relatively thin strip of sheet metal, as spring steel, and herein shown as having spaced bracket arms 6 and 7 and an intermediate portion 8. Integrally formed with bracket 5 is a friction nut utilizing one arm 7 as one leg of a U-shaped bolt or screw retaining device having as its other leg, the member 9 herein shown as formed by bending outwardly and then reversely an extension of the bracket arm 7. The bight portion 10 of the U-shaped friction nut may be the full width of arm 7 and at the open end of the U the inwardly bent end portion 11 of member 9 is employed in association with a tab 12 of lesser width to accurately space member 9 from arm 7 while preventing accidental separation thereof. Tab 12 is best shown in Figs. 1 and 3 and comprises an extension from the central portion of the inturned end 11 which passes through a slot 12a in arm 7 and is bent to contact the inner surface of such arm.

The friction nut provides means in one of its legs for receiving and engaging the threads of a screw 13 or other threaded element and also provides means in its other leg for exerting a constant frictional tension upon the shank of the threaded element without entering its threads. As herein shown, the member 9 is formed with the screw thread engaging means which may be in the form of a keyhole slot having a substantially circular opening 14 and radial slot 15. The body of the member 9, surrounding the opening 14, is dimpled to provide a frusto-conical section with the walls of opening 14 shaped to conform to the threads of the screw or other threaded element 13.

The arm 7 is formed with the means for exerting friction or tension upon the threaded portion of the bolt shank, which, as best shown in Figs. 1 and 3, consist of a pair of tongues 16 integrally connected at their outer ends only with arm 7. The free inner ends of the tongues 16 are inturned to form lips 17 separated from each other by a distance slightly less than the diameter of the screw, whereby lips 17 apply positive, constant resilient friction at a distance from the thread-receiving walls of slot 15 upon the shank of the bolt positioned within the friction nut.

The desired distance between the legs of the U-shaped friction nut may readily be maintained by the upturned end portion 11 of member 9 in connection with the tab 12 struck from the central portion of end portion 11. The edges of end portion 11 on each side of tab 12 engage the underside of arm 7, positively preventing approach of the open end of the U-shaped member beyond the desired spacing. Tab 12 likewise engages the upper face of arm 7 and prevents separation of the legs of the U-shaped member beyond the desired spacing.

The upturned lips 17 of tongues 16 press resiliently upon the threaded portion of the screw 13 at a desired distance in advance of the thread-receiving slot 15 of the friction nut and so prevents undesired rotation of screw 13, as because of vibration of the instrument on which my improved friction nut is employed. However, the tension exerted by lips 17 may be overcome by applying an appropriate tool, as, for example, a screwdriver, to the head of the screw, and after the screw has been turned as desired in either direction, the lips 17 and slot 15 will cooperate in maintaining the bolt in its new adjusted position.

Although I have illustrated and described a preferred form of my invention, I do not wish to be limited thereby because the scope of my invention is best designated by the following claims.

I claim:

1. Sheet metal friction nut comprising a substantially U-shaped structure having one of its legs provided with an apertured screw engaging portion adapted for threaded engagement with a screw, the other leg of said structure being provided with cooperating yieldable screw-retaining elements integral with said second-mentioned leg and having bent portions on their adjacent extremities forming lips positioned to press against the section of a screw at a distance from the screw engaging portion, and means for maintaining desired spacing between the legs of said U-shaped structure including an inturned end portion on one leg engaging one face of the other leg and an integral extension of said end portion passing through said other leg and engaging the opposite face thereof.

2. Sheet metal friction nut comprising a substantially U-shaped structure having one of its legs provided with an aperture, the walls of which are angled to conform to the threads of a screw, the other leg being provided with cooperating yieldable screw-retaining elements integral with said second-mentioned leg and having bent portions on their adjacent extremities forming lips positioned to press against the sides of a screw, and integrally formed means for spacing the legs of said U-shaped structure including an inturned end portion on one leg engaging one face of the other leg and an integral extension of said end portion passing through said other leg and engaging the opposite face thereof.

3. A combination bracket and friction nut device integrally formed from a single strip of sheet metal and including a substantially U-shaped structure at one of its terminals having cooperating yieldable screw-retaining elements in its respective legs, one leg of such structure being apertured and deformed to engage the threads of a screw and the other leg being provided with oppositely-directed tongues having their free extremities adjacent each other and bent rearwardly to form lips positioned to resiliently press against the threaded portion of the bolt at a distance from the first-mentioned leg, and means integrally formed with said device for maintaining desired spacing between the legs of the U-shaped structure including an inturned end portion on one leg engaging one face of the other leg and an integral extension of said end portion passing through said other leg and engaging the opposite face thereof.

ROBERT R. AMESBURY.

REFERENCES CITED

The following references are of record in the file of this patent:

UNITED STATES PATENTS

| Number | Name | Date |
|---|---|---|
| Re. 21,769 | Tinnerman | Apr. 8, 1941 |
| 995,893 | Neitzel | June 20, 1911 |
| 2,173,544 | Tinnerman | Sept. 19, 1939 |
| 2,326,903 | Tinnerman | Aug. 17, 1943 |
| 2,328,757 | Tinnerman | Sept. 7, 1943 |
| 2,350,315 | Kral | May 30, 1944 |
| 2,378,957 | Tinnerman | June 26, 1945 |
| 2,399,957 | Tinnerman | May 7, 1946 |
| 2,408,153 | Steans et al. | Sept. 24, 1946 |